(12) United States Patent
Miyamae et al.

(10) Patent No.: US 10,071,618 B2
(45) Date of Patent: Sep. 11, 2018

(54) TONNEAU COVER DEVICE

(71) Applicant: PIOLAX, INC., Yokohama-shi (JP)

(72) Inventors: Hitoshi Miyamae, Yokohama (JP); Hiroaki Asai, Nagoya (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 45 days.

(21) Appl. No.: 15/414,199

(22) Filed: Jan. 24, 2017

(65) Prior Publication Data
US 2017/0210212 A1 Jul. 27, 2017

(30) Foreign Application Priority Data

Jan. 26, 2016 (JP) ................................ 2016-012421

(51) Int. Cl.
| | | |
|---|---|---|
| *B60J 7/14* | (2006.01) | |
| *B60J 7/02* | (2006.01) | |
| *B60J 7/19* | (2006.01) | |
| *B60J 7/057* | (2006.01) | |

(52) U.S. Cl.
CPC ................ *B60J 7/02* (2013.01); *B60J 7/057* (2013.01); *B60J 7/198* (2013.01)

(58) Field of Classification Search
CPC ..... B60J 7/198; B60J 7/057; B60J 7/02; B60J 7/14
USPC .................................. 296/98, 100.04, 37.16
See application file for complete search history.

(56) References Cited

U.S. PATENT DOCUMENTS

| | | | | |
|---|---|---|---|---|
| 5,330,246 A | * | 7/1994 | Bernardo | ................ B60J 7/068 160/130 |
| 5,931,521 A | * | 8/1999 | Kooiker | ................... B60J 7/141 296/100.09 |
| 7,258,387 B2 | * | 8/2007 | Weldy | ....................... B60J 7/08 296/100.04 |
| 8,511,737 B2 | * | 8/2013 | Wilke | ................... B60J 7/1851 292/256 |
| 8,702,150 B2 | * | 4/2014 | Saito | ...................... B60R 5/047 296/100.04 |
| 9,694,656 B2 | * | 7/2017 | Maimin | ................... B60J 7/085 |
| 2003/0193210 A1 | * | 10/2003 | Addicott | ................... B60J 7/08 296/100.04 |

(Continued)

FOREIGN PATENT DOCUMENTS

JP H 10-250483 A 9/1998

*Primary Examiner* — Pinel E Romain
(74) *Attorney, Agent, or Firm* — McGinn IP Law Group, PLLC

(57) ABSTRACT

The embodiment provides a tonneau cover device. The tonneau cover device includes a tonneau cover and a fixing device to engage with a lock portion to thereby hold the tonneau cover in a pulled-out-and-held state. The fixing device includes: a slider provided in a slidable manner and a hook provided in a swingable manner. When a force is exerted on an engagement protruding portion of the hook as a result of pushing in the tonneau cover toward the winding direction from the pulled-out-and-held state, and the exerted force acting on the engagement protruding portion is larger than the normally-given urging force acting on the engagement protruding portion, the hook swings such that the engagement protruding portion retracts into the case while causing the slider to be pushed in away from the sidewall, thereby being disengaged from the locking portion.

6 Claims, 12 Drawing Sheets

(56) References Cited

U.S. PATENT DOCUMENTS

2012/0068482 A1\* 3/2012 Takada .................. E05C 1/145
 292/336.3
2017/0240033 A1\* 8/2017 Dylewski, II ............ B60J 7/198

\* cited by examiner

TONNEAU COVER DEVICE

CROSS-REFERENCE TO RELATED APPLICATION(S)

This application claims priority from Japanese Patent Application No. 2016-012421 filed on Jan. 26, 2016, the entire contents of which are incorporated herein by reference.

FIELD

The present invention relates to a tonneau cover device that pulls out and winds a tonneau cover which covers a cargo chamber of a vehicle.

BACKGROUND

For example, a cargo chamber of a vehicle such as a wagon vehicle and a hatchback vehicle is covered with a tonneau cover. The tonneau cover is pulled out and wound by a tonneau cover device as necessary.

JP-H10-250483-A describes a tonneau cover device that includes a cover main body, end caps attached to a pull-out end of the cover main body, and side trims provided to both sides of a cargo chamber, the side trims including engagement holes into which the end caps drop to be engaged therewith. The engagement holes include opening portions that are opened on the upper surfaces of the side trims, and engaging portions inside the engagement holes that are horizontally long to the front side of the vehicle. Meanwhile, the end caps include hook portions on their lower sides that are bent in an L-shape.

When the cover main body is pulled out a given length toward the rear side of the vehicle while the end caps slide on the upper surfaces of the side trims, the hook portions of the end caps drop in the engagement holes through the opening portions to get in to be engaged with the engaging portions, whereby the cover main body is maintained in a pull-out state. On the other hand, by pulling up the end caps in this state to pull the hook portions out of the engagement holes, the cover main body is wound by a known winding spring.

In the above-described tonneau cover device, when winding the cover, the operation of pulling the distal end portion of the cover in the direction orthogonal to the pull-out direction of the tonneau cover, i.e., upward to pull the hook portion of the end cap out of the engagement hole, is required, so that there causes a trouble in winding workability of the tonneau cover when a user has baggages with both hands.

SUMMARY

One object of the present invention is to provide a tonneau cover device capable of winding a tonneau cover with simple operation.

One aspect of the present invention provide
a tonneau cover device including:
a tonneau cover provided to cover a cargo chamber of a vehicle and configured to be pulled out from a wound state;
a fixing device attached on both sides of the tonneau cover at one end thereof toward a pull-out direction; and
a cover-urging mechanism configured to urge the tonneau cover in a winding direction that is opposite to the pull-out direction,
wherein a locking portion is provided on a sidewall of the cargo chamber and configured to be engageable with the fixing device on the tonneau cover when the tonneau cover is pulled out against an urging force of the cover-urging mechanism to thereby hold the tonneau cover at a pulled-out position,
wherein the fixing device includes:
a case fixed to the tonneau cover, the case having an opening opposed to the sidewall;
a slider mounted slidably on the case, the slider being slidable in a sliding direction intersecting the pull-out direction;
a hook supported swingably on the slider, the hook having an engagement protruding portion configured to retractably protrude from the opening of the case in accordance with a swinging movement of the hook to be engageable with the locking portion;
a spring provided to urge the slider against the sidewall; and a conversion mechanism configured to convert a sliding movement of the slider toward the sidewall into a swinging movement of the hook such that the engagement protruding portion protrudes from the opening of the case, and to convert a sliding movement of the slider to be away from the sidewall into a swinging movement of the hook such that the engagement protruding portion retracts into the case, and
wherein, when a force is exerted on the engagement protruding portion as a result of pushing in the tonneau cover toward the winding direction from a pulled-out-and-held state where the engagement protruding portion is engaged with the locking portion and the tonneau cover is held at the pulled-out position, and the exerted force acting on the engagement protruding portion is larger than the urging force of the cover-urging mechanism acting on the engagement protruding portion, the hook swings such that the engagement protruding portion retracts into the case while causing the slider to be pushed in away from the sidewall through the conversion mechanism, thereby being disengaged from the locking portion.

The present invention may further provide
the tonneau cover device,
wherein a sliding amount of the slider to be away from the sidewall when the engagement protruding portion is pressed toward the pull-out direction to cause the hook to swing as a result of pushing in the tonneau cover toward the winding direction from the pulled-out-and-held state to thereby be disengaged from the locking portion is a first sliding amount,
wherein a sliding amount of the slider to be away from the sidewall when the engagement protruding portion is pressed toward the winding direction to cause the hook to swing as a result of pulling out the tonneau cover toward the pull-out direction from the pulled-out-and-held state to thereby be disengaged from the locking portion is a second sliding amount, and
wherein the first sliding amount is larger than the second sliding amount.

The present invention may further provide
the tonneau cover device,
wherein the conversion mechanism includes:
a shaft portion provided to one of the slider and the hook; and
a groove portion provided to the other of the slider and the hook, into which the shaft portion is slidably inserted,
wherein the shaft portion includes:
a first shaft portion; and
a second shaft portion,
wherein the groove portion includes:

a first groove portion that is formed along the sliding direction, into which the first shaft portion is slidably inserted; and a second groove portion that is formed to intersect the first groove portion, into which the second shaft portion is slidably inserted, and wherein, when the hook swings, the first shaft portion slides inside the first groove portion while the second shaft portion slides inside the second groove portion to draw a swinging trajectory on an outer side of the first shaft portion, so that the slider is pressed to slide.

The present invention may further provide the tonneau cover device, wherein the second shaft portion is disposed further than the first shaft portion in the pull-out direction.

The present invention may further provide the tonneau cover device, wherein the hook includes a first supporting portion and a second supporting portion that are capable of abutting on edge portions on both sides of the opening of the case, wherein, when the tonneau cover is pulled out, the first supporting portion abuts on one of the edge portions on the pull-out direction, and the one of the edge portions functions as a supporting point of the swinging movement of the hook, wherein, when the tonneau cover is wound in the winding direction, the second supporting portion abuts on the other one of the edge portions on the winding direction, and the other one of the edge portions functions as a supporting point of the swinging movement of the hook, and wherein a distance between the second supporting portion and the second shaft portion is longer than a distance between the first supporting portion and the second shaft portion.

The present invention may further provide the tonneau cover device, wherein the spring presses a position of the slider that overlaps the second groove portion when the slider is seen in the sliding direction.

With the tonneau cover device according to the present invention, the cargo chamber of the vehicle can be covered with the tonneau cover by pulling out the tonneau cover from a winding device against the urging force of the cover-urging mechanism to make the engagement protruding portion of the hook engaged with the locking portion to hold the tonneau cover at the pulled-out position.

The tonneau cover device is capable of easily winding the tonneau cover with simple operation of only pushing in the tonneau cover toward the winding direction, whereby winding workability of the tonneau cover can be improved since when a force larger than the urging force of the cover-urging mechanism is exerted on the engagement protruding portion as the tonneau cover is pushed in toward the winding direction, the hook swings, and while the slider is pushed in toward the direction away from the sidewall by the conversion mechanism, the engagement protruding portion retracts into the case to thereby release the engagement with the locking portion.

BRIEF DESCRIPTION OF DRAWINGS

FIG. 7A is a perspective view of the slider. FIG. 7B is a perspective view of the slider seen from a direction different from FIG. 7A.

FIG. 8A is a perspective view of the hook. FIG. 8B is a perspective view of the hook seen from a direction different from FIG. 8A.

FIG. 11A is an explanatory view where the hook is engaged with a locking portion. FIG. 11B is an explanatory view of a case where the tonneau cover is pulled out from the state shown in FIG. 11A. FIG. 11C is an explanatory view of a case where the tonneau cover is further pulled out from the state shown in FIG. 11B.

FIG. 12A is an explanatory view where the hook is engaged with a locking portion. FIG. 12B is an explanatory view of a case where the tonneau cover is pushed in from the state shown in FIG. 12A. FIG. 12C is an explanatory view of a case where the tonneau cover is further pushed in from the state shown in FIG. 12B.

DETAILED DESCRIPTION

Figure 1:
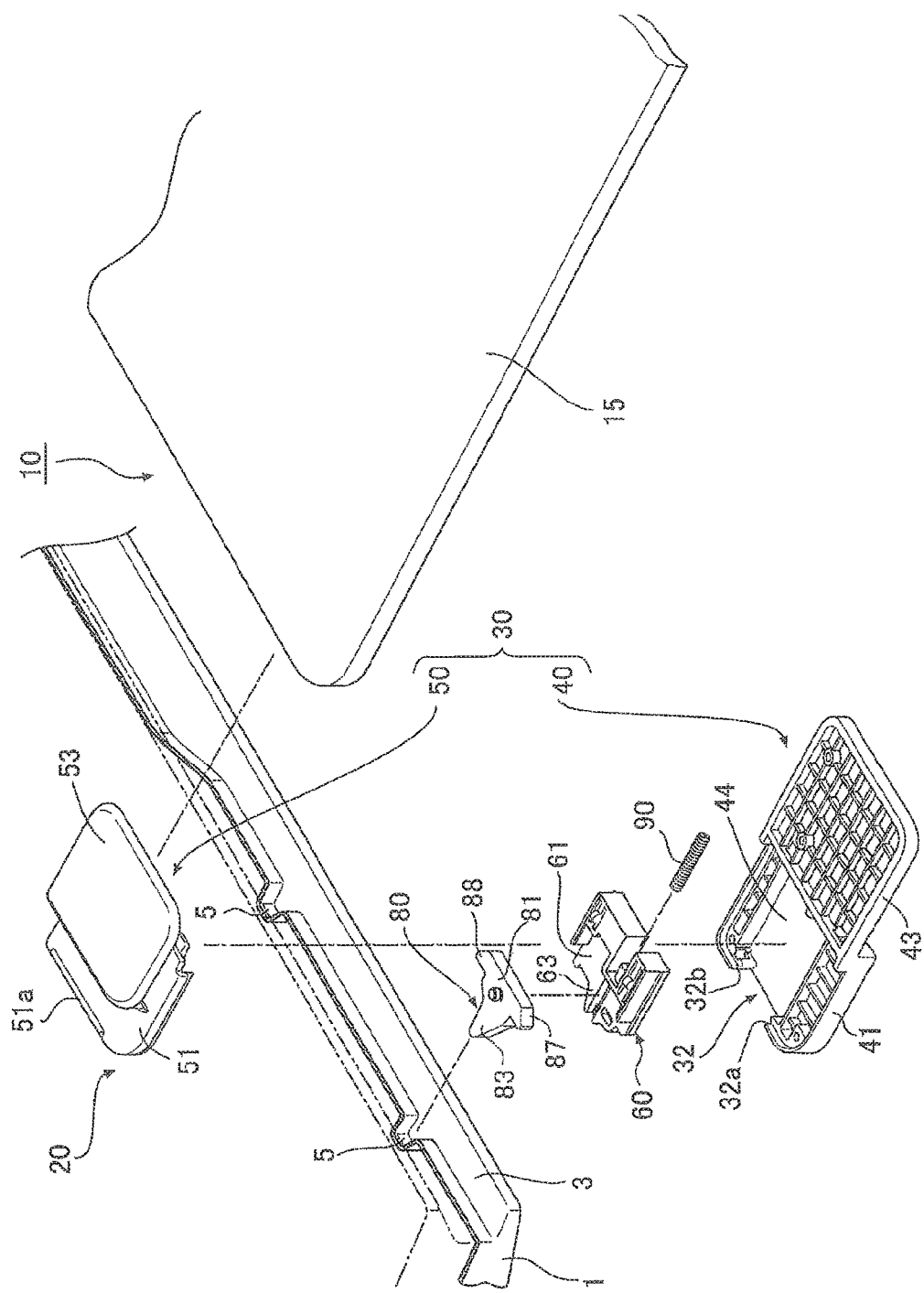
FIG. 1 is an exploded perspective view of a tonneau cover device according to one embodiment.

Hereinafter, a tonneau cover device according to one embodiment will be described referring to the drawings.

Figure 2:
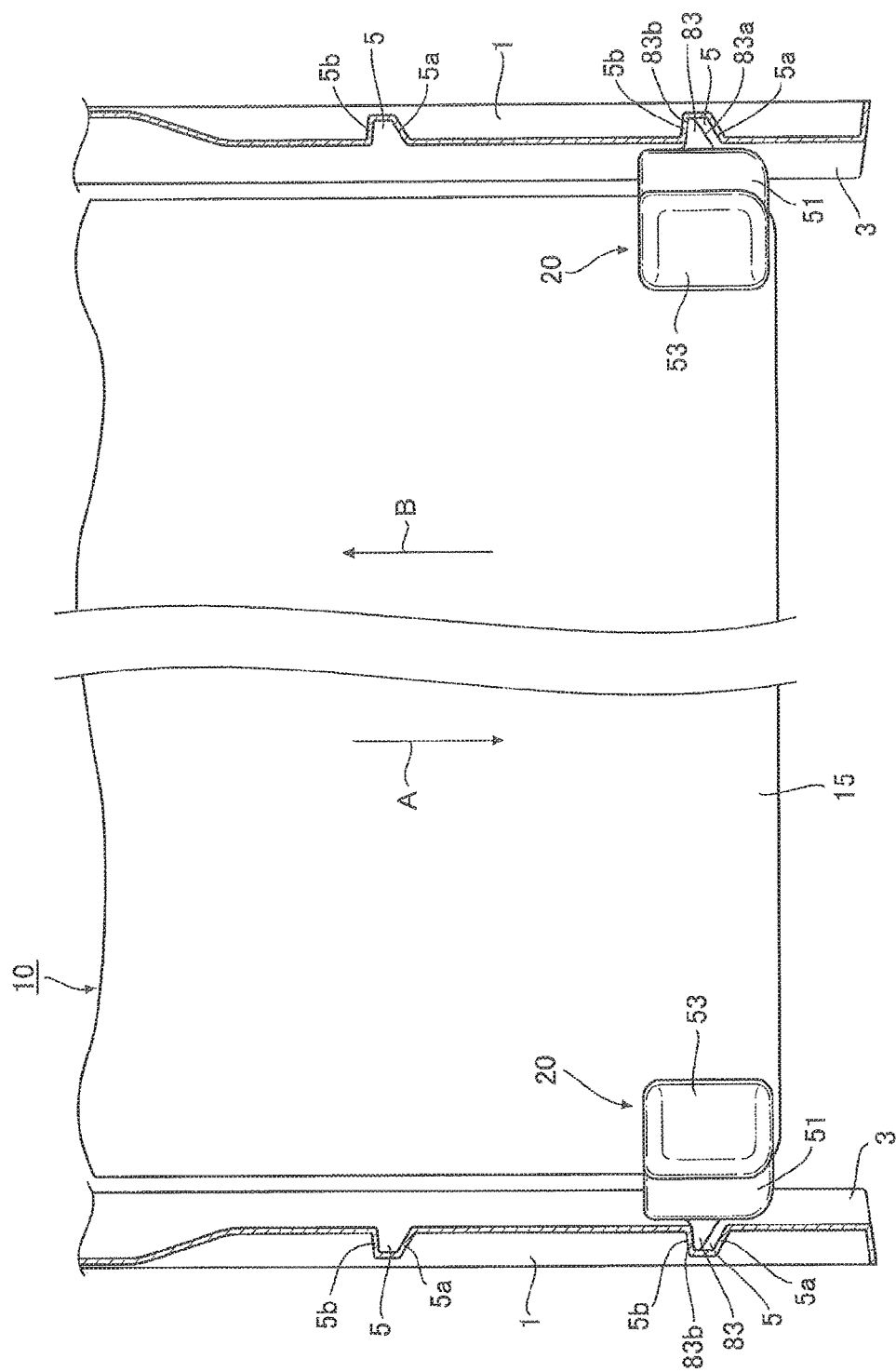
FIG. 2 is a plan view of the tonneau cover device.
Figure 3:
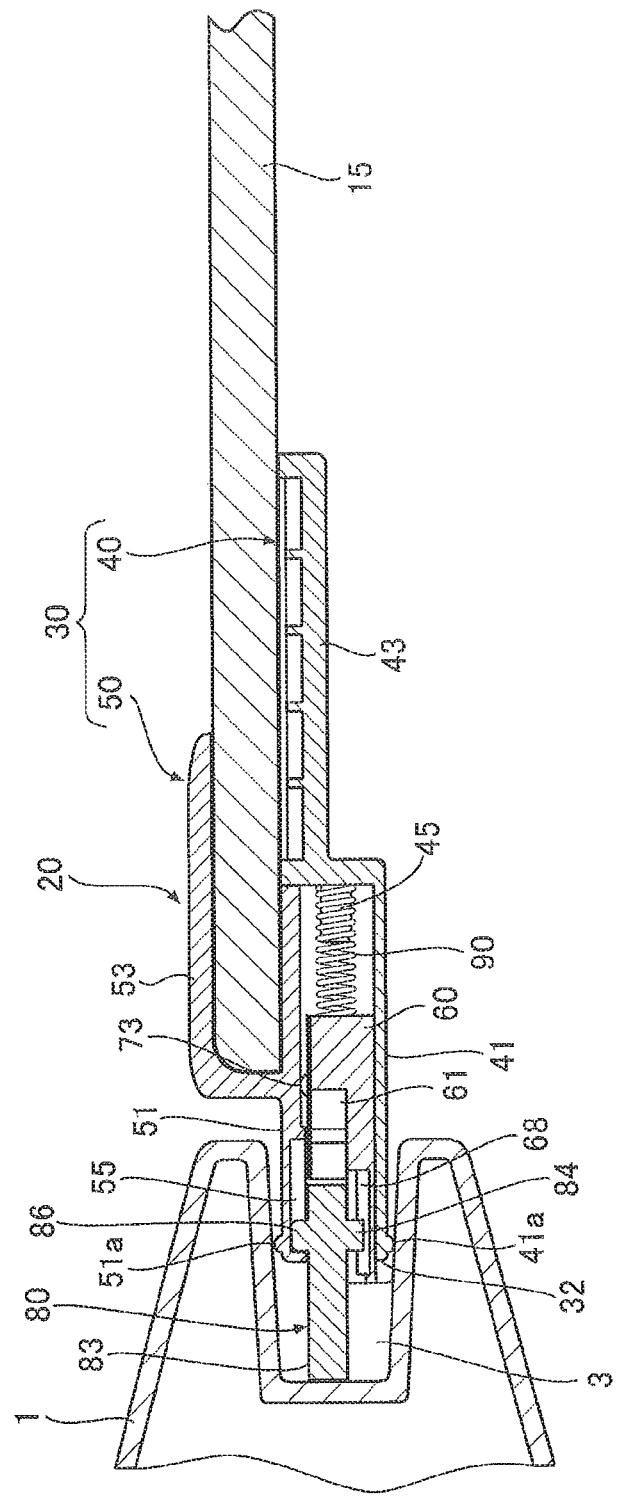
FIG. 3 is an enlarged cross-sectional view of relevant components of the tonneau cover device.

As shown in FIGS. 1 to 3, a tonneau cover device 10 according to the present embodiment includes a tonneau cover 15 provided to cover a cargo chamber of a vehicle. A pair of fixing devices 20 and 20 are attached to the tonneau cover 15 on its both sides at an end on a pull-out direction A of the tonneau cover 15. The tonneau cover 15 is urged in a winding direction B that is opposite to the pull-out direction A (hereinafter, referred to as the "winding direction B") by a cover-urging mechanism (not illustrated) in a normal state. The tonneau cover device 10 further includes a winding device (not illustrated) for winding the tonneau cover 15.

As shown in FIGS. 1 and 2, in the present embodiment, guide portions 3 and 3 having a grooved rail shape are provided to sidewalls 1 and 1 provided to the cargo chamber of the vehicle along the front-back direction of the vehicle, and the fixing devices 20 get into the guide portions 3 and 3 to be slid and guided thereby (see FIG. 3).

Each of the sidewalls 1 includes locking portions 5. The locking portions 5 are engageable with the fixing device 20 of the tonneau cover 15 when the tonneau cover 15 is pulled out against the urging force of the cover-urging mechanism, to thereby hold the tonneau cover 15 at the pulled-out position. The fixing devices 20 include engagement protruding portions 83 of hooks 80 to be described later, with which the locking portions 5 are engaged (see FIGS. 11A and 12A).

The plural locking portions 5 are disposed at given intervals along the extending direction of each sidewall 1 in the present embodiment as shown in FIG. 2 (two pieces in the present embodiment).

With the configuration of including the plural locking portions 5 as described above, the tonneau cover 15 can be held at a give position by engaging the engagement protruding portions 83 of hooks 80 with the given locking portions 5.

Figure 11A:
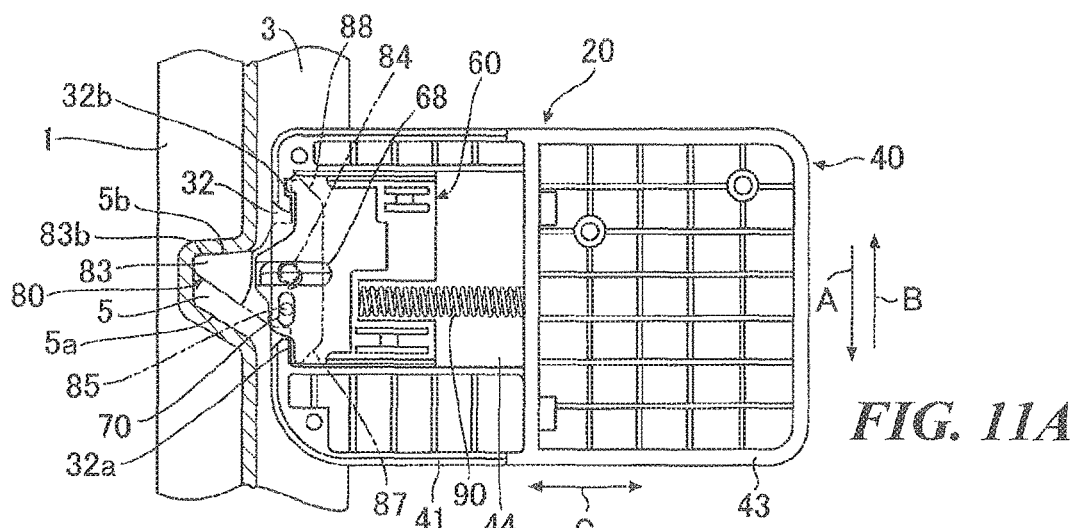
FIGS. 11A to 11C are explanatory views for illustrating the operations of the slider and the hook at the time of pulling out a tonneau cover.
Figure 12A:
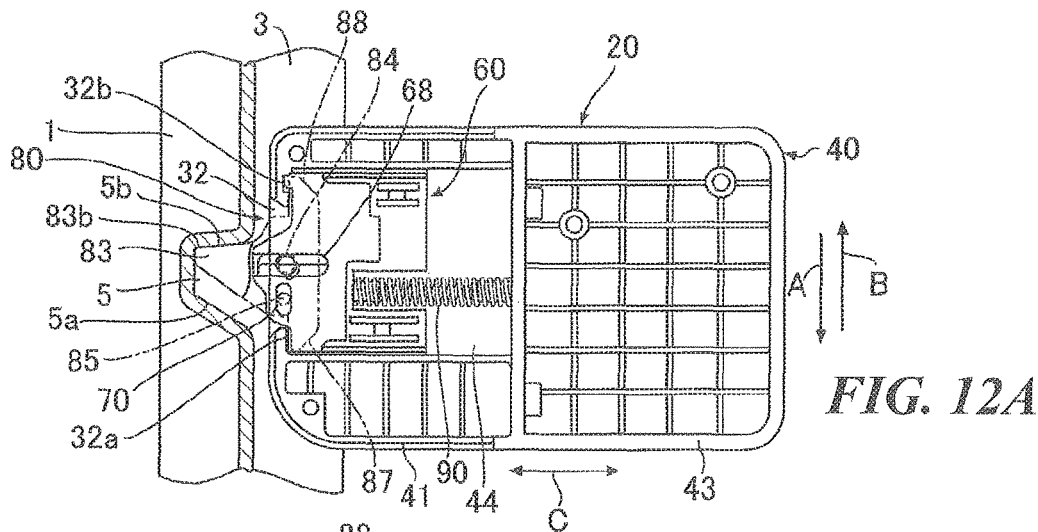
FIGS. 12A to 12C are explanatory views for illustrating the operations of the slider and the hook at the time of winding a tonneau cover.

Each of the locking portions 5 according to the present embodiment includes a first inner surface 5a having a tapered surface shape of a given angle and disposed on its surface on the pull-out direction A of the tonneau cover 15, and a second inner surface 5b having a tapered surface shape of a steeper angle than the angle of the first inner surface 5a and disposed on its surface on the winding direction B of the tonneau cover 15 as shown in FIGS. 11A and 12A. The shape of the locking portions 5 is not particularly limited, and one or three or more pieces of the locking portions may be used.

Each of the sidewalls 1 according to the present embodiment includes the guide portion 3 having a length over the almost entire area of the cargo chamber so as to guide the fixing device 20 from the state where the tonneau cover 15 is wound by the winding device until the tonneau cover 15 is pulled out to a given pulled-out position. The guide portions 3 may be provided only partially to the sidewalls 1. To be specific, the fixing devices 20 may be guided only by a given distance before the tonneau cover 15 has been pulled out but not yet been locked by the locking portions 5. According to the present invention, the "sidewalls" of the cargo chamber conceptually includes trim boards, guide rails, or the like that are provided separately, and are not particularly limited, as long as these elements can cause the hooks to swing by pressing the engagement protruding portions thereof when a tonneau cover is pulled out and wound.

The fixing devices 20 attached to the tonneau cover 15 on its both sides include cases 30, hooks 80, and the like to be described later that have right-left symmetric shapes as shown in FIG. 2; however, since the fixing devices 20 on both sides have the same basic structures, the components on both the sides are provided with same reference numerals (the fixing device 20 disposed on the left side of the vehicle is explained in the drawings beginning from FIG. 3).

Next, the fixing devices 20 will be described. Each of the fixing devices 20 includes a case 30 fixed to the tonneau cover 15 and having an opening 32 opposed to the sidewall 1, a slider 60 mounted on the case 30 slidably in a direction intersecting the pull-out direction A of the tonneau cover 15, a hook 80 supported swingably on the slider 60 and provided with an engagement protruding portion 83 configured to retractably protrude from the opening 32 of the case 30 to be engageable with the locking portion 5, a spring 90 provided to urge the slider 60 against the sidewall 1. Each of the fixing devices includes a conversion mechanism configured to convert a sliding movement of the slider 60 toward the sidewall 1 into a swinging movement of the hook 80 in a direction in which the engagement protruding portion 83 protrudes from the opening 32 of the case 30 while converting a sliding movement of the slider 60 in a direction away from the sidewall 1 into a swinging movement of the hook 80 in a direction in which the engagement protruding portion 83 retracts into the case 30.

Figure 5:
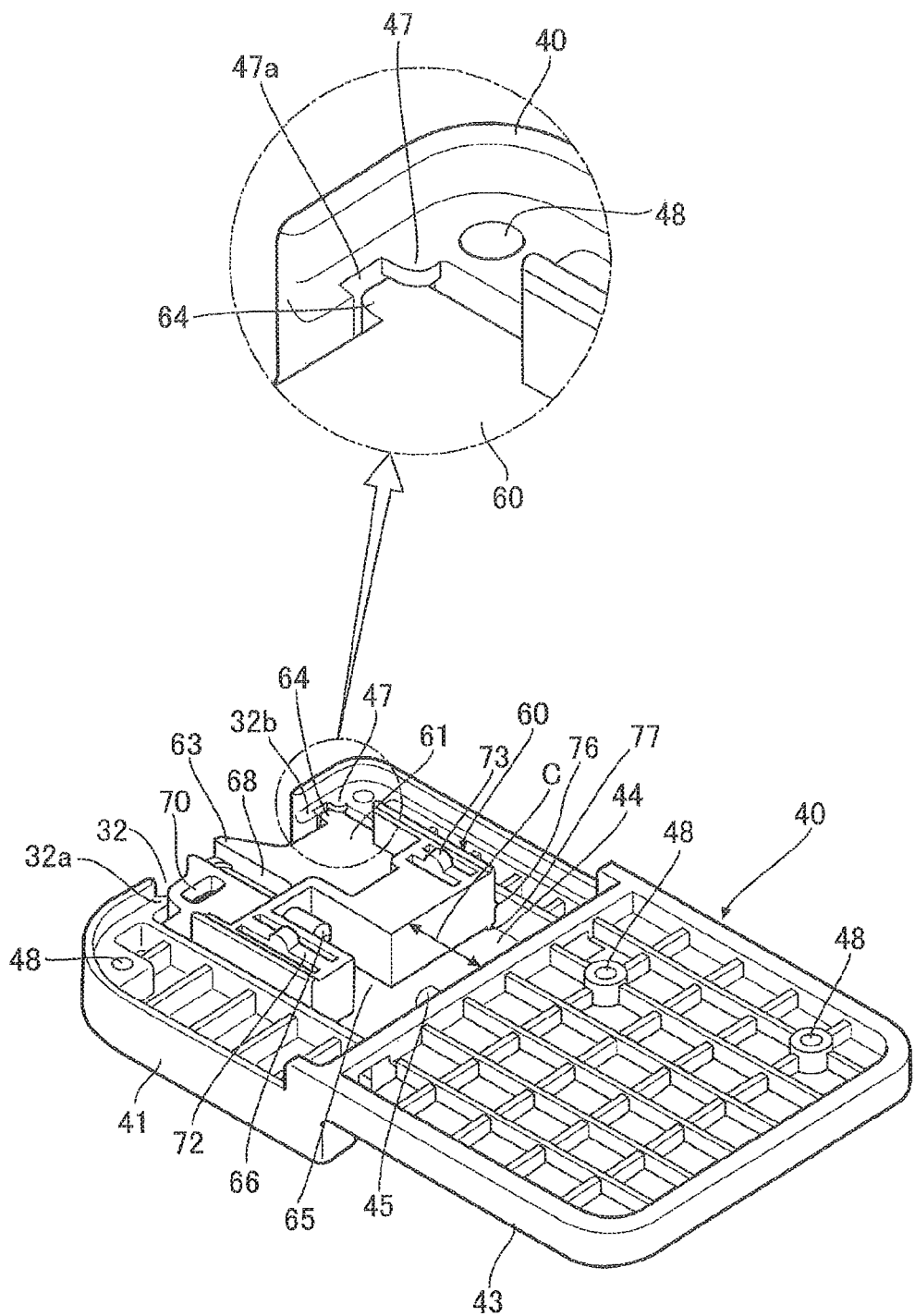
FIG. 5 is a perspective view of the tonneau cover device where a slider is mounted on a lower case.
Figure 6:
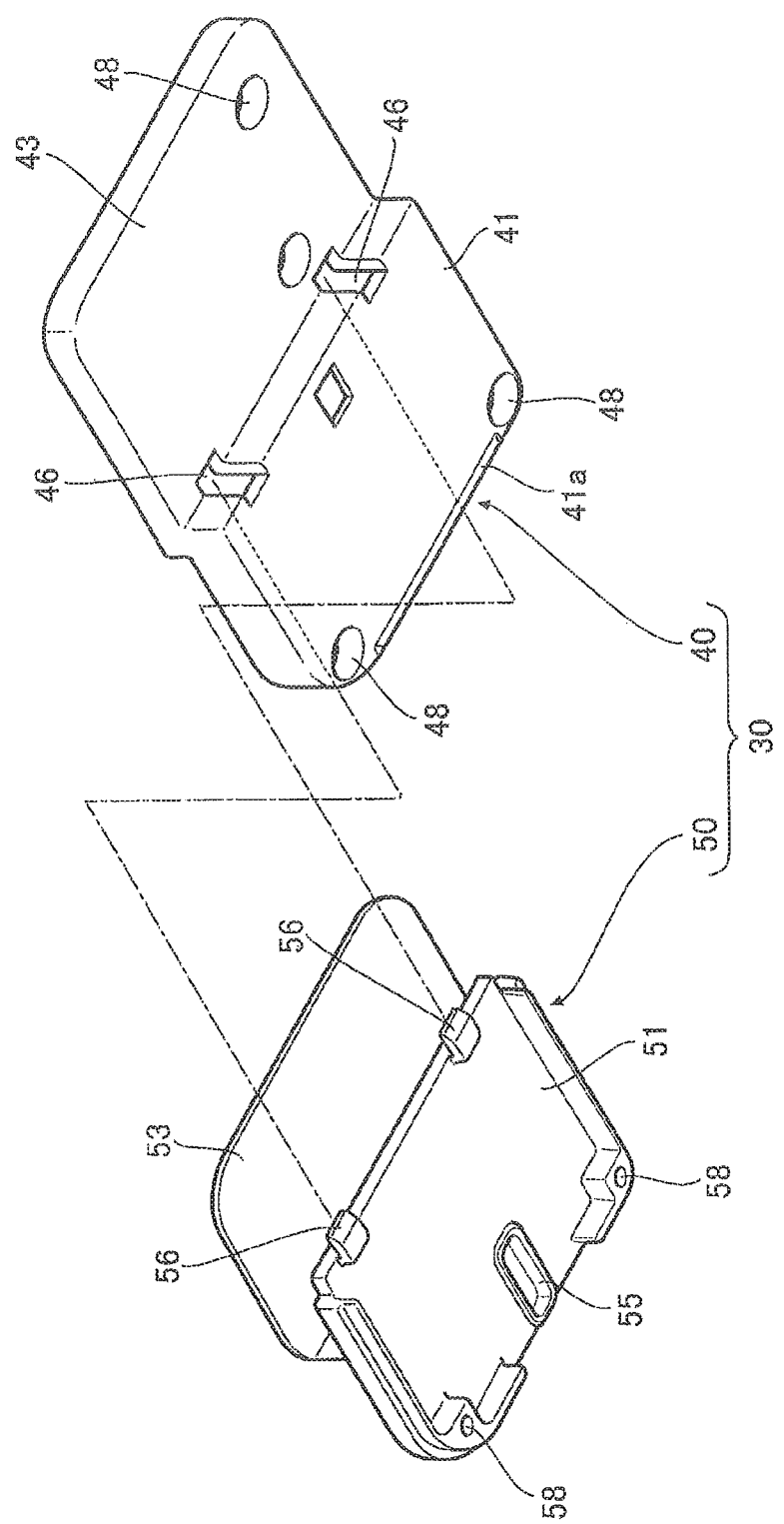
FIG. 6 is an exploded perspective view of a case that constitutes the tonneau cover device.

The case 30 according to the present embodiment includes a lower case 40 and an upper case 50 to be mounted on the lower case 40. The lower case 40 includes a base portion 41 having a frame-like shape and opened in the center at the distal end on the sidewall 1 side, and a sandwiching portion 43 extending from the base end side of the base portion 41 so as to be an approximately L-shaped staircase to abut on the back surface of the tonneau cover 15 as shown in FIGS. 1, 5, and 6. The opening in the center at the distal end of the base portion 41 and an opening in the center at the distal end of a base portion 51 of the upper case 50 to be described later form the opening 32 of the case 30. The edge portion of the opening 32 on the pull-out direction A of the tonneau cover 15 defines a "pull-out-side edge portion 32a", and the edge portion of the opening 32 on the winding direction B of the tonneau cover 15 defines a "winding-side edge portion 32b" (see FIGS. 11A and 12A).

Figure 4:
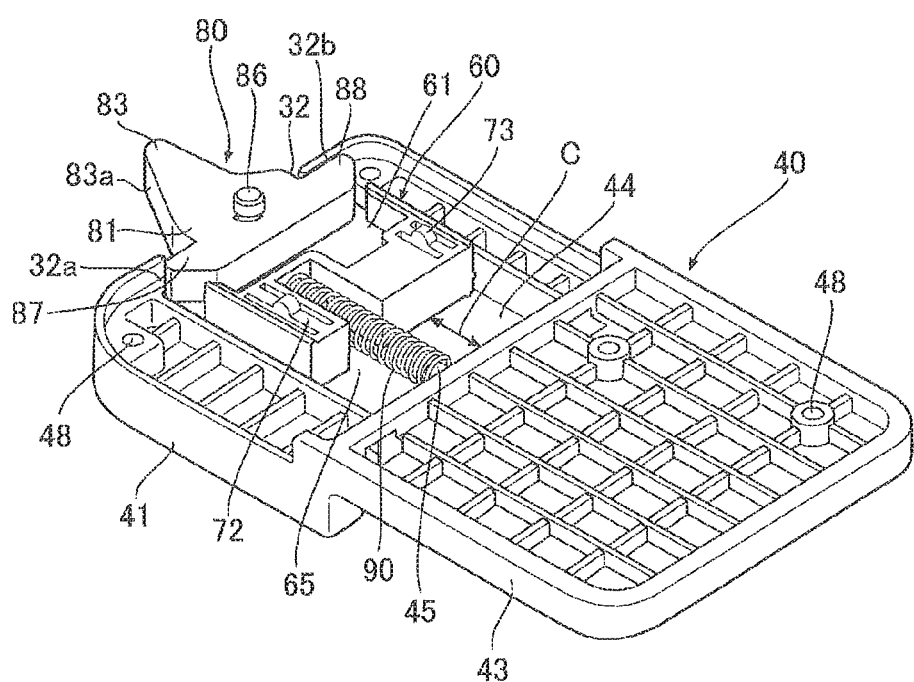
FIG. 4 is an enlarged perspective view of relevant components of the tonneau cover device.

A slider housing recess 44 extending along the longitudinal direction of the lower case 40 is provided inside the base portion 41, and is configured to house the slider 60 so as to be slidable in the direction intersecting the pull-out direction A of the tonneau cover 15 (see FIG. 4). A spring supporting projection 45 configured to support one end of the spring 90 that defines a coil spring protrudes from the inner surface on the base end side of the slider housing recess 44 as shown in FIG. 5. A pair of fitting holes 46 and 46 are provided on the base end surface of the base portion 41 as shown in FIG. 6.

A recess 47a is provided on the peripheral edge of one lateral part of the opening of the base portion 41, and a retaining piece 47 configured to retain the slider 60 housed in the slider housing recess 44 protrudes from the inner periphery of the recess 47a as shown in FIG. 5.

The upper case 50 includes the base portion 51 having a frame-like shape and opened in the center at the distal end on the sidewall 1 side, and a sandwiching portion 53 extending from a position close to the base end of the base portion 51 and having an approximate L-shape so as to sandwich the tonneau cover 15 as shown in FIGS. 1, 3, and 6. A shaft guide portion 55 having a recessed shape is provided in the center at the distal end on the inner surface of the base portion 51 along the longitudinal direction of the upper case 50 as shown in FIG. 6, whereby a guide shaft portion 86 of the hook 80 (see FIG. 8A) to be described later can be guided (see FIG. 3).

A pair of fitting pawls 56 and 56 protrude outward from the base end of the base portion 51. By fitting the pair of fitting pawls 56 and 56 into the pair of fitting holes 46 and 46 of the lower case 40 and screwing screws into plural screw holes 48 and 58 provided to the lower case 40 and the upper case 50, the upper case 50 is mounted on the lower case 40 to form the opening 32 in the center at the distal end on the sidewall 1 side. The tonneau cover 15 is inserted to be sandwiched between the base portion 51 and the sandwiching portion 53 of the upper case 50, and further sandwiched by the sandwiching portion 43 of the lower case 40 as shown in FIG. 3, whereby the fixing device 20 is mounted on the tonneau cover 15. Protrusions 41a and 51a protrude on the upper surface at the distal end of the base portion 41 of the lower case 40 and on the upper surface at the distal end of the base portion 51 of the upper case 50, respectively, as shown in FIGS. 1 and 6. The protrusions 41a and 51a abut on the upper and lower inner surfaces of the guide portion 3 (see FIG. 3).

Next, the slider 60 will be described with reference to FIGS. 7A, 7B and other drawings.

Figure 7A:
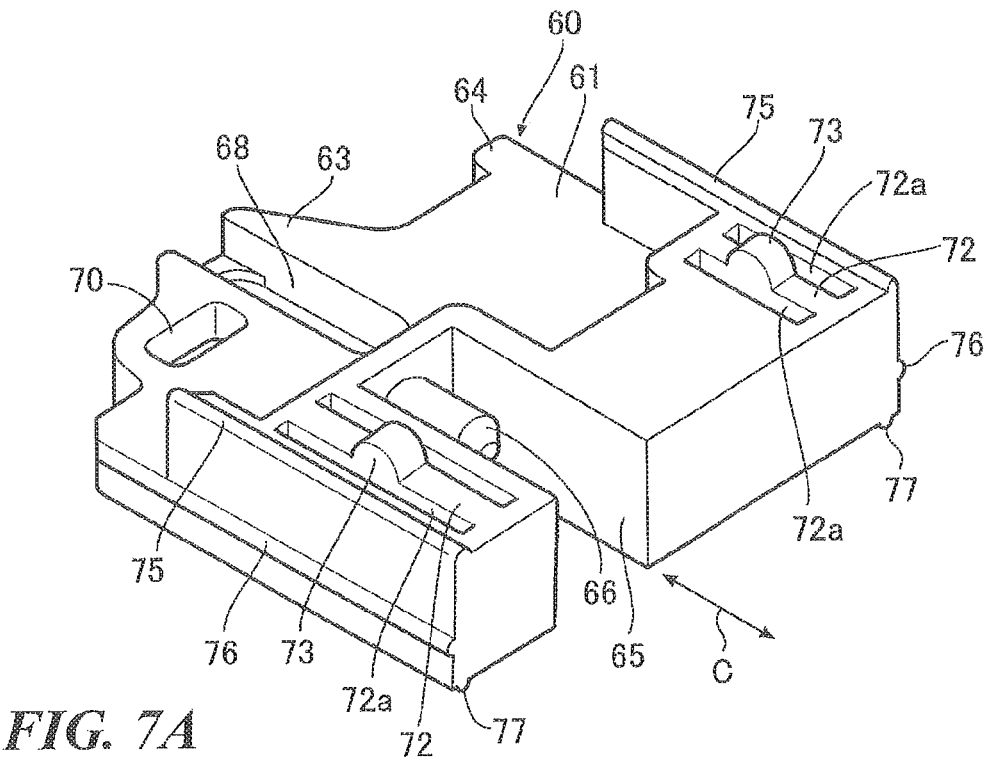
FIGS. 7A and 7B are views of the slider that constitutes the tonneau cover device.
Figure 7B:
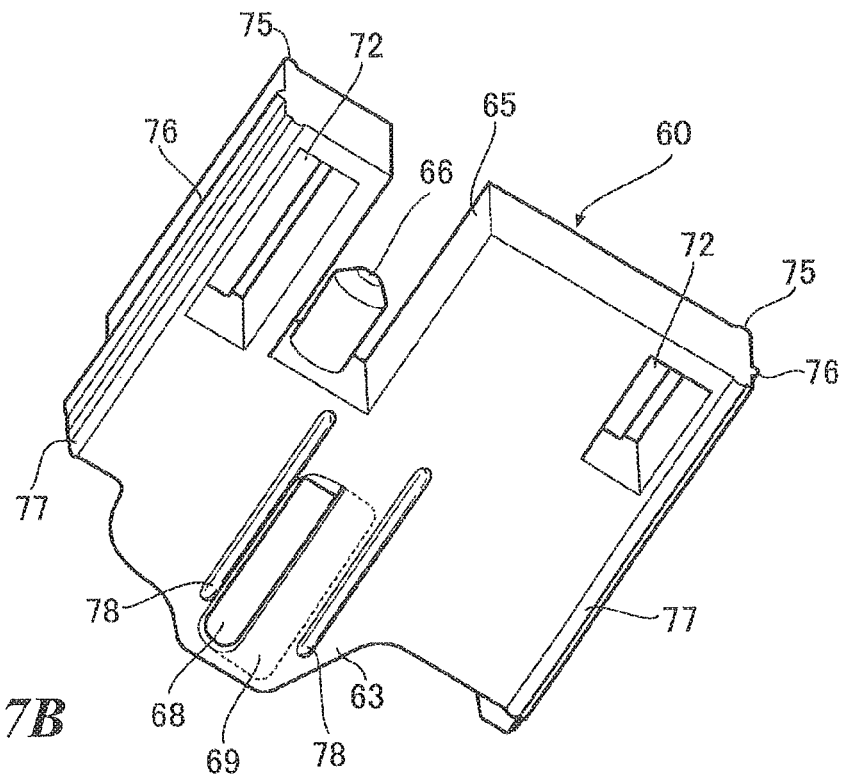

The slider 60 according to the present embodiment has a block shape having a given thickness that is fitted to the slider housing recess 44 of the case 30 as shown in FIGS. 7A and 7B. The slider 60 is housed in the slider housing recess 44 slidably in the direction intersecting the pull-out direction A of the tonneau cover 15, i.e., along the right and left width direction of the vehicle in the present embodiment. The sliding direction of the slider 60 is represented by "C" in the following description.

A hook-placing recess 61 having a given recessed shape is provided on a surface of the slider 60 (the surface on the side of the upper case 50, the same applies hereinafter) at a position close to the sidewall 1 as shown in FIGS. 1 and 7A. The hook 80 is provided swingably in the hook-placing recess 61. A protruding portion 63 having the same height as the hook-placing recess 61 and an approximate chevron shape protruding outward protrudes from the center portion in the width direction on an end face of the slider 60 on the sidewall 1 side. A retaining protrusion 64 protrudes from one lateral part in the width direction of an end face of the slider 60 on the sidewall 1 side, and gets into the recess 47a of the lower case 40 to be engaged with the inner surface of the retaining piece 47 to retain the slider 60 (see FIG. 5)

A recess 65 is provided at the end portion of the slider 60 that is opposite to the protruding portion 63. A spring supporting projection 66 protrudes from the recess 65. The spring supporting projection 66 supports the other end of the spring 90. The spring 90 is supported at its both ends by the spring supporting projection 66 and the spring supporting projection 45 of the above-described case 30 to be interposed in a compressed state between the slider 60 and the slider housing recess 44. The spring 90 urges the slider 60 against the sidewall 1.

A first groove portion 68 into which the first shaft portion 84 of the hook 80 to be described later is slidably inserted is provided on surfaces of the hook-placing recess 61 and the protruding portion 63 along the sliding direction C of the slider 60. The first groove portion 68 is disposed at a position deviated from the recess 65 and the spring supporting projection 66 when the slider 60 is seen in a planar direction, and is positionally deviated from the spring 90 as shown in FIGS. 11A to 11C and 12A to 12C.

A closed rib 69 having a thin plate shape is provided to a bottom portion of the first groove portion 68 on the side of the lower case 40, and about half of the lower opening of the first groove portion 68 is closed as shown in FIG. 7B. The "groove portion" may include a non-penetrating recess, in addition to a through hole portion.

Figure 9:
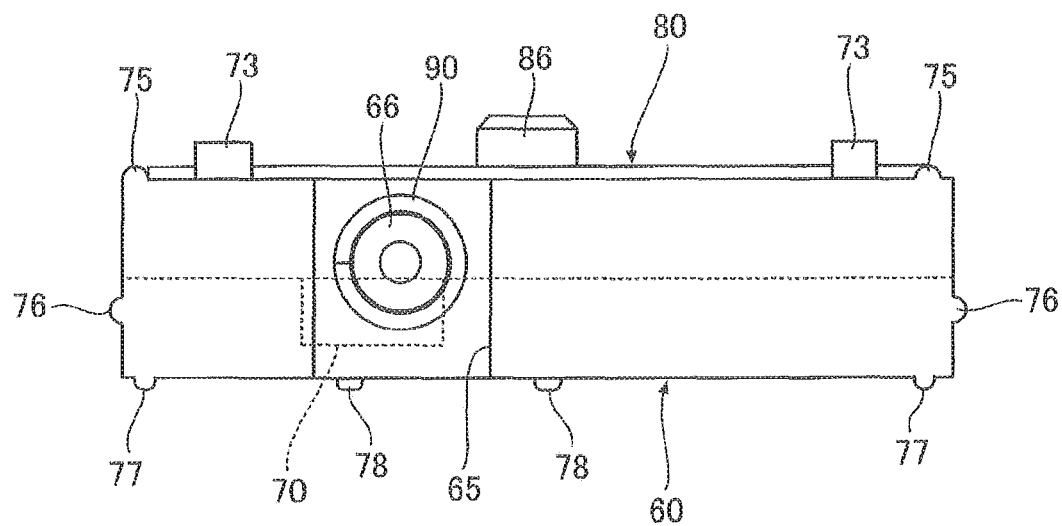
FIG. 9 is a perspective view of the slider on which the hook is mounted.

A second groove portion 70 into which a second shaft portion 85 of the hook 80 to be described later is inserted is provided on a surface of the protruding portion 63 of the slider 60 so as to intersect the first groove portion 68 as shown in FIG. 7A. The second groove portion 70 according to the present embodiment is disposed closer to the pull-out direction A of the tonneau cover 15 than the first groove portion 68, and has a recessed shape extending orthogonal to the first groove portion 68. The second groove portion 70 partially overlaps the recess 65 and the spring supporting projection 66 when the slider 60 is seen in the sliding direction C as shown in FIG. 9. Thus, the spring 90 presses a position of the slider 60 that overlaps the second groove portion 70 when the slider 60 is seen in the sliding direction C.

Elastic pieces 72 each of which is flexible with a pair of slits 72a and 72a are provided on the side opposite to the protruding portion 63 on both sides of the slider 60 that are orthogonal to the sliding direction C, and protrusions 73 having a semicircular shape protrude from the centers on the surfaces of the elastic pieces 72 as shown in FIG. 7A. The protrusions 73 abut on the inner surface of the base portion 51 of the upper case 50 when the lower case 40 is mounted on the upper case 50 (see FIG. 3), and bend the elastic pieces 72 to give a reaction force to prevent the slider 60 from rattling in the sliding movement.

As shown in FIGS. 7A and 7B, protrusions 75, 76, 77, and 78 extending along the sliding direction C of the slider 60 are respectively provided on the outer peripheral edges of the elastic pieces 72 of the slider 60, at positions closer to the back surface of the slider 60 (the surface on the side of the lower case 40, the same applies hereinafter) on both sides orthogonal to the sliding direction C of the slider 60, on the peripheral edges on both sides along the sliding direction C on the back surface of the slider 60, and on the peripheral edges on both sides on the back surface of the first groove portion 68. The protrusions 75 abut on the inner surface of the base portion 51 of the upper case 50, the protrusions 76 abut on both side surfaces inside the slider housing recess 44, and the protrusions 77 and 78 abut on the inner surface of the base portion 41 of the lower case 40 to prevent the slider 60 from rattling while having the function of reducing sliding resistance of the slider 60.

Figure 8A:
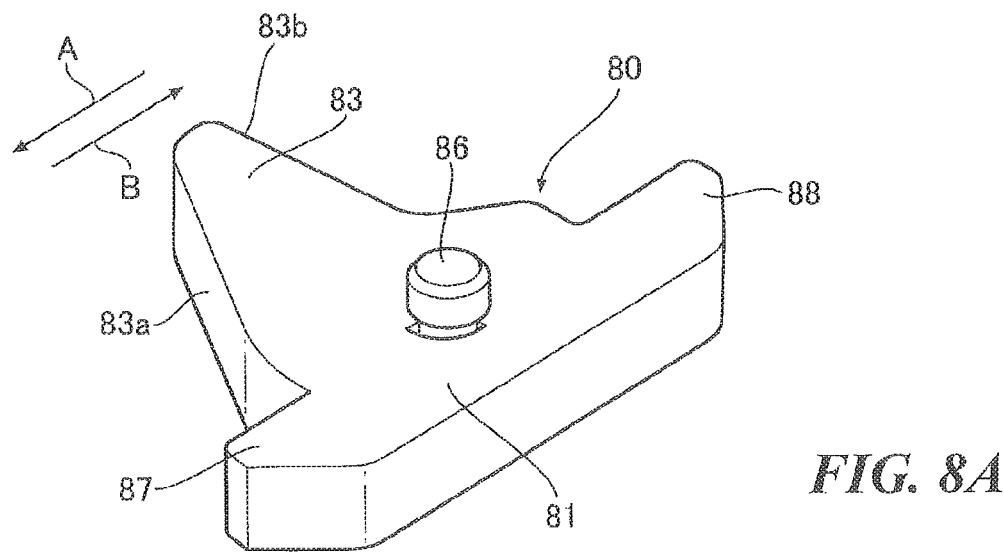
FIGS. 8A and 8B are views of a hook that constitutes the tonneau cover device.

Next, the hook 80 will be described with reference to FIGS. 8A, 8B and other drawings. The hook 80 according to the present embodiment is disposed on the upper surface of the hook-placing recess 61 of the slider 60, and includes a swinging portion 81 that is supported swingably on the plural shaft portions 84 and 85 to be described later. The engagement protruding portion 83 has a tapered protruding shape, and protrudes from the distal end of the swinging portion 81. The engagement protruding portion 83 retractably protrudes from the opening 32 of the case 30 to be engageable with the locking portion 5. The engagement protruding portion 83 includes a first outer surface 83a having a tapered surface shape of a given angle and disposed on a surface on the pull-out direction A of the tonneau cover 15, and a second outer surface 83b having a tapered surface shape of a steeper angle than the angle of the first outer surface 83a and disposed on a surface on the winding direction B of the tonneau cover 15 so as to be fitted to the first inner surface 5a and the second inner surface 5b of the locking portion 5 on the sidewall 1 as shown in FIGS. 8A and 10.

The first shaft portion 84 inserted into the first groove portion 68 of the slider 60 and the second shaft portion 85 inserted into the second groove portion 70 of the slider 60 protrude from the back surface of the swinging portion 81 (the surface on the side of the slider 60). The first shaft portion 84 is disposed approximately in the center on the back surface of the swinging portion 81, and the second shaft portion 85 is disposed closer to the pull-out direction A of the tonneau cover 15 than the first shaft portion 84.

A retaining protrusion 84a having the shape of a quarter of a circular disk is provided at the distal end of the first shaft portion 84.

Figure 10:
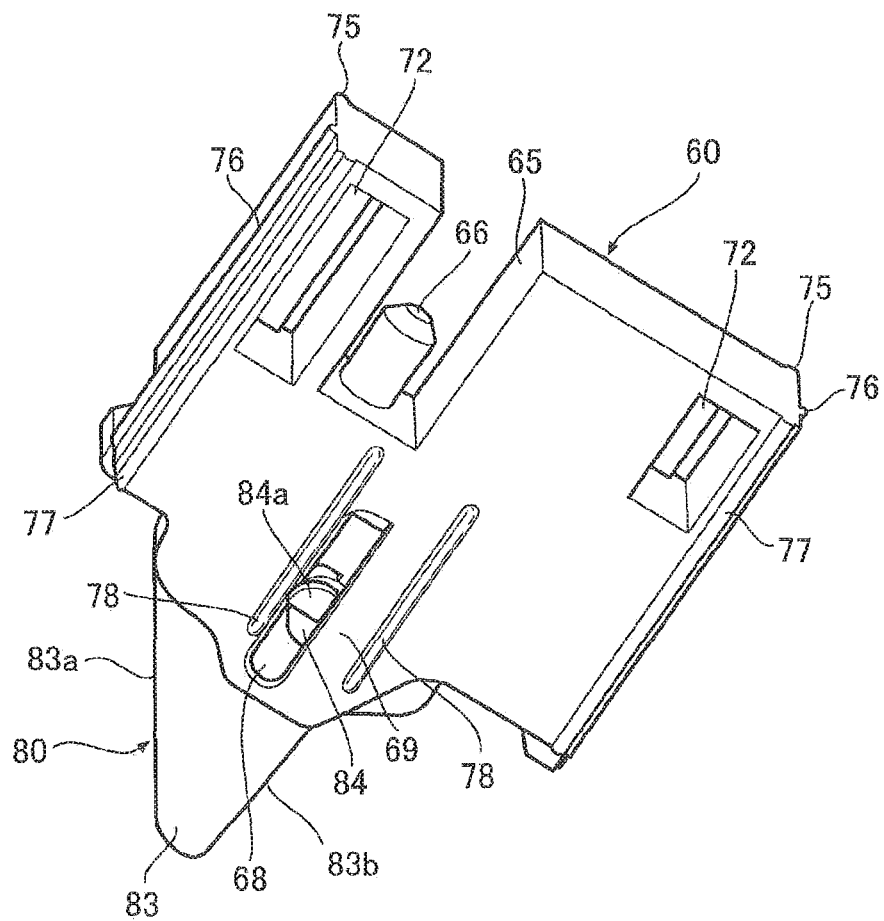
FIG. 10 is an explanatory view of the slider seen from a sliding direction.

The retaining protrusion 84a defines a portion that is engaged with the peripheral edge on the back side of the lower opening of the first groove portion 68 of the slider 60 to retain the hook 80 with respect to a direction vertical to the slider 60 as shown in FIG. 10.

The guide shaft portion 86 protrudes from a position on a surface of the swinging portion 81 (the surface on the side of the upper case 50), the position being matched to the first shaft portion 84. The guide shaft portion 86 is inserted into the recess-shaped shaft guide portion 55 of the upper case 50 (see FIGS. 3 and 6) to guide the swinging movement of the hook 80.

A first supporting portion 87 and a second supporting portion 88 capable of abutting on the edge portions 32a and 32b on both the sides of the opening 32 of the case 30 protrude from both the sides at the base end of the swinging portion 81. To be specific, the first supporting portion 87 that abuts on the pull-out-side edge portion 32a of the opening 32 is provided on one lateral part on the pull-out direction A of the base end of the swinging portion 81 while the second supporting portion 88 that abuts on the winding-side edge portion 32b of the opening 32 is provided on the other lateral part on the winding direction B of the base end of the swinging portion 81. The outer surfaces of the base ends of the first supporting portion 87 and the second supporting portion 88 have a tapered shape of a given angle, which prevents the first supporting portion 87 and the second supporting portion 88 from interfering with the inner surfaces of the slider housing recess 44 when the hook 80 swings.

Figure 8B:
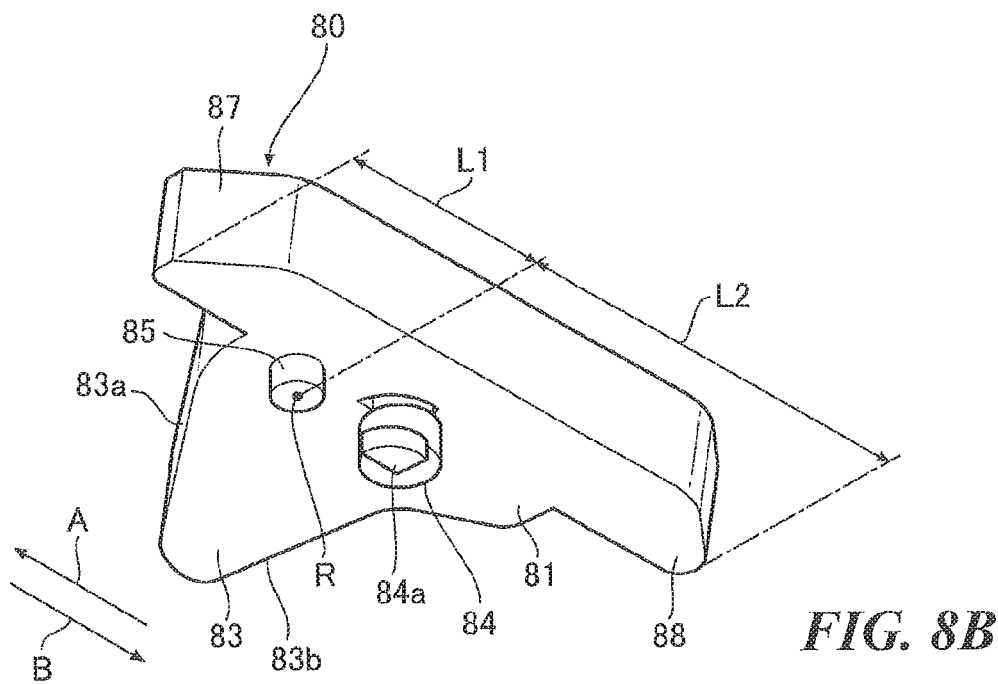

L2 is formed longer than L1 as shown in FIG. 8B, when L1 represents the distance from the first supporting portion 87 to the second shaft portion 85 (the distance from the center R of the second shaft portion 85 to the most distal end face of the first supporting portion 87 in the present embodiment), while L2 represents the distance from the second supporting portion 88 to the second shaft portion 85 (the distance from the center R of the second shaft portion 85 to the most distal end face of the second supporting portion 88 in the present embodiment).

Next, the relation between the swinging movement of the hook 80 and the sliding movement of the slider 60 will be described.

As shown in FIGS. 11A and 12A, in a state where the tonneau cover 15 is pulled out toward the pull-out direction A and the engagement protruding portion 83 of the hook 80 is engaged with a given locking portion 5 on the sidewall 1, the slider 60 is urged against the sidewall 1 by the spring 90, and the protruding portion 63 protrudes from the opening of the case 30. Further, in that state, the second shaft portion 85 of the hook 80 is pressed by the second groove portion 70 of the slider 60 to make the engagement protruding portion 83 protrude from the opening 32 of the case 30. Still further, in that state, the first supporting portion 87 and the second supporting portion 88 of the hook 80 are maintained in the state of abutting, respectively on the pull-out-side edge portion 32a and the winding-side edge portion 32b of the opening 32 of the case 30. The first shaft portion 84 and the second shaft portion 85 are disposed approximately in the centers of the first groove portion 68 and the second groove portion 70 in this state.

Figure 11B:
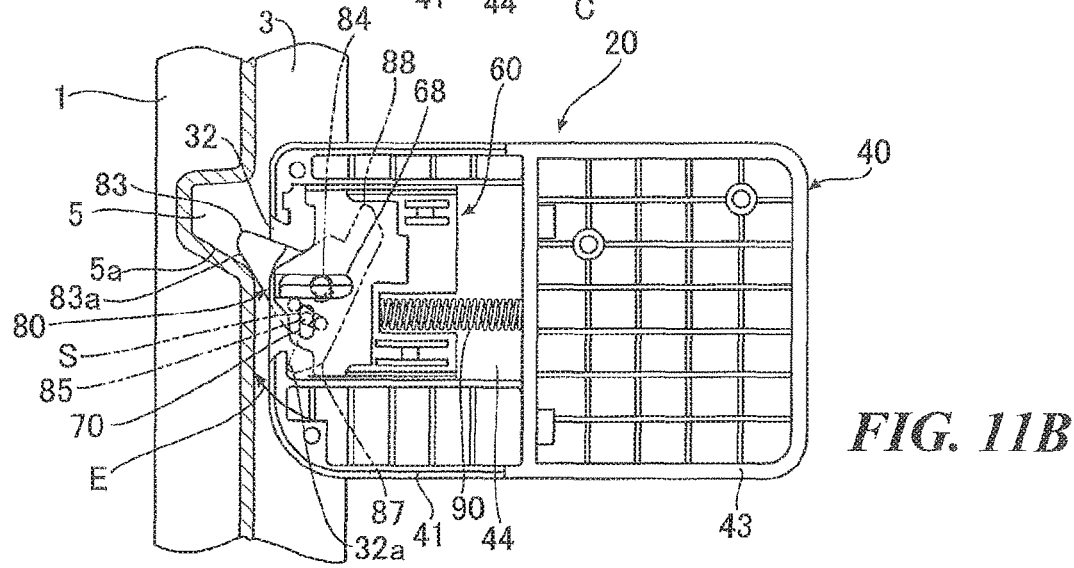

When the tonneau cover 15 is pulled out toward the pull-out direction A in a state where the engagement protruding portion 83 of the hook 80 is engaged with the locking portion 5 as shown in FIG. 11A, the first outer surface 83a of the engagement protruding portion 83 is pressed by the first inner surface 5a of the locking portion 5, the first supporting portion 87 abuts on the pull-out-side edge portion 32a of the opening 32, and the hook 80 swings in the arrow E direction with the pull-out-side edge portion 32a as a supporting point of the swinging movement of the hook 80, and thus the engagement protruding portion 83 starts disengaging from the locking portion 5 as shown in FIG. 11B. At this time, the first shaft portion 84 slides inside the first groove portion 68 in the direction opposite to the protruding direction of the slider 60, and the second shaft portion 85 slides inside the second groove portion 70 in the swinging movement direction E same as the hook 80 with drawing such a swinging trajectory S that the second shaft portion 85 swings on the outer side of the first shaft portion 84, and presses the second groove portion 70, whereby the slider 60 is pushed in a direction away from the sidewall 1 against the urging force of the spring 90 (see FIG. 11B).

Figure 11C:
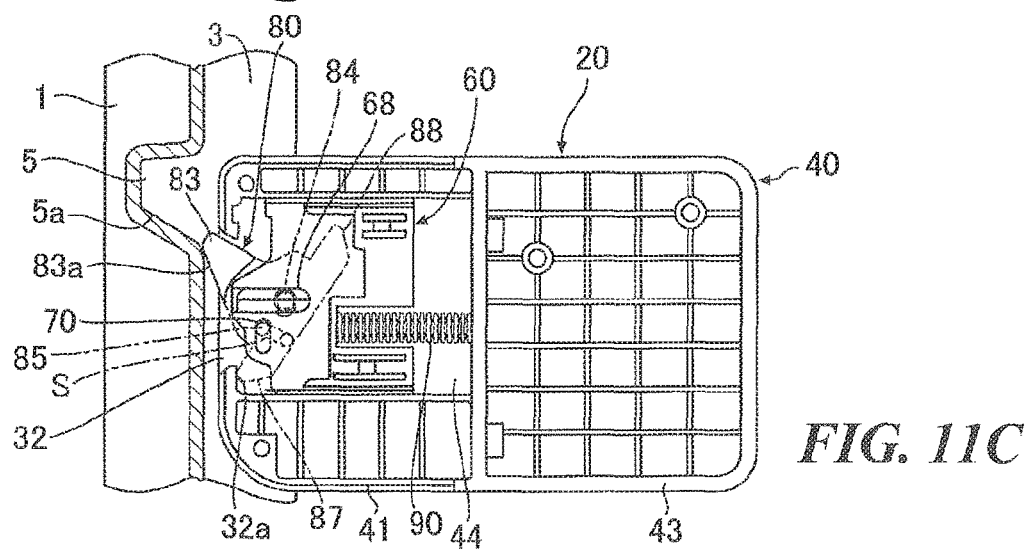

When the tonneau cover 15 is further pulled out toward the pull-out direction A, the distal end of the engagement protruding portion 83 is pressed by the inner surface of the guide portion 3 of the sidewall 1, the hook 80 further swings in the arrow E direction, and the engagement protruding portion 83 disengages from the locking portion 5 and retracts into the case 30 while the second shaft portion 85 presses the second groove portion 70 to further push the slider 60 in the direction away from the sidewall 1 (see FIG. 11C).

Figure 12B:
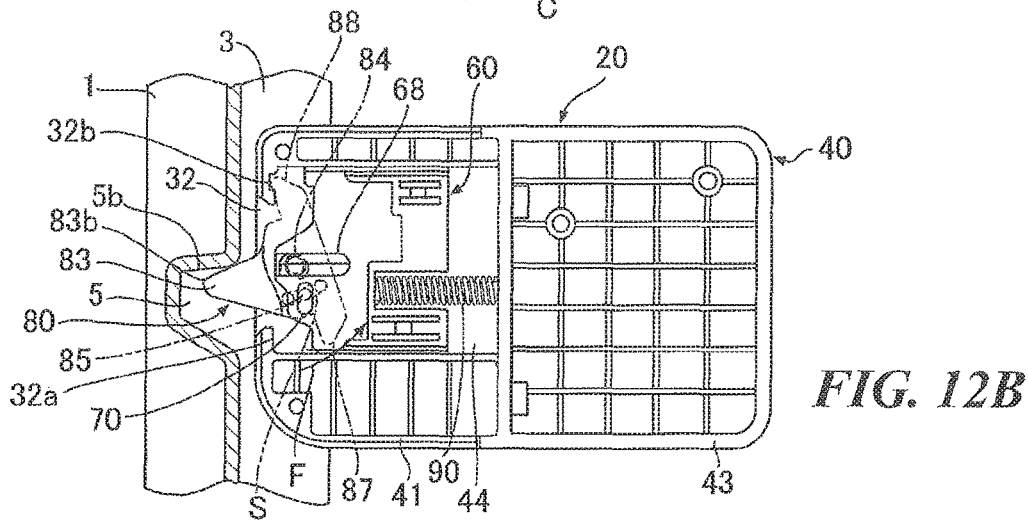

When the tonneau cover 15 is pushed in toward the winding direction B in a state where the engagement protruding portion 83 of the hook 80 is engaged with the locking portion 5 as shown in FIG. 12A, the second outer surface 83b of the engagement protruding portion 83 is pressed by the second inner surface 5b of the locking portion 5, the second supporting portion 88 abuts on the winding-side edge portion 32b of the opening 32, and the hook 80 swings in the arrow F direction with the winding-side edge portion 32b as a supporting point of the swinging movement of the hook 80, and thus the engagement protruding portion 83 starts disengaging from the locking portion 5 as shown in FIG. 12B. At this time, the first shaft portion 84 slides inside the first groove portion 68 in the protruding direction of the slider 60, and the second shaft portion 85 slides inside the second groove portion 70 in the swinging movement direction F same as the hook 80 with drawing such a swinging trajectory S that the second shaft portion 85 swings on the outer side of the first shaft portion 84, and the second shaft portion 85 presses the second groove portion 70, whereby the slider 60 is pushed in a direction away from the sidewall 1 against the urging force of the spring 90 (see FIG. 12B).

Figure 12C:
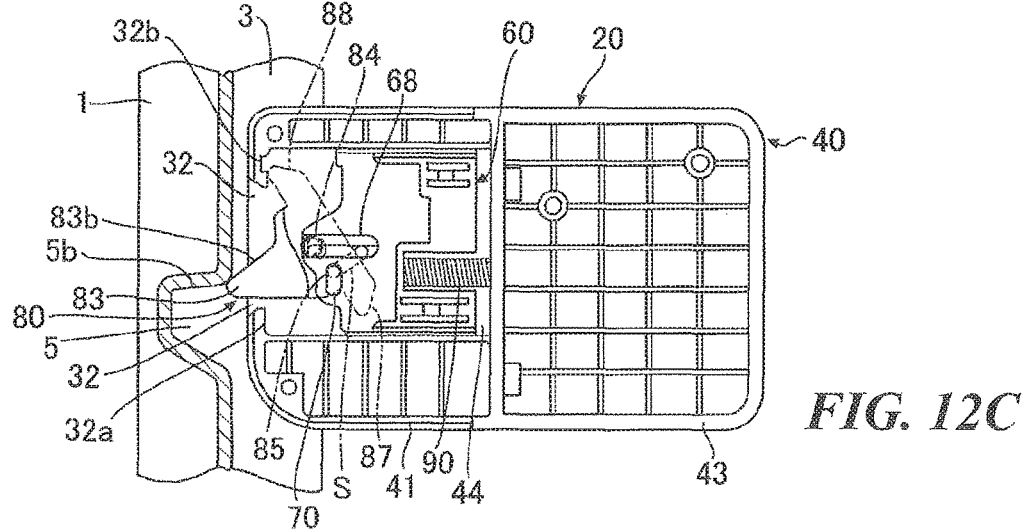

When the tonneau cover 15 is further pushed in toward the winding direction B, the distal end of the engagement protruding portion 83 is pressed by the inner surface of the guide portion 3 of the sidewall 1, the hook 80 further swings in the arrow F direction, and the engagement protruding portion 83 disengages from the locking portion 5 and retracts into the case 30 while the second shaft portion 85 presses the second groove portion 70 to push the slider 60 in the direction away from the sidewall 1 (see FIG. 12C).

As described above, when the hook 80 swings, the first shaft portion 84 of the hook 80 slides inside the first groove portion 68 of the slider 60 while the second groove portion 70 of the slider 60 is pressed by the second shaft portion 85 of the hook 80, whereby the slider 60 moves away from the sidewall 1 against the urging force of the spring 90 in the present embodiment. To be specific, the first shaft portion 84 and the first groove portion 68 are mainly functioning as supporting the swinging movement of the hook 80 while the second groove portion 85 and the second groove portion 70 are functioning as conveying a pressure force accompanied by the swinging movement of the hook 80 to the slider 60. The plural shaft portions 84 and 85 and the plural groove portions 68 and 70 define the "conversion mechanism" that is configured to convert the sliding movement of the slider 60 toward the sidewall 1 into the swinging movement of the hook 80 in the direction in which the engagement protruding portion 83 protrudes from the opening 32 of the case 30 while converting the sliding movement of the slider 60 in the direction away from the sidewall 1 into the swinging movement of the hook 80 in the direction in which the engagement protruding portion 83 retracts into the case 30.

Thus, the tonneau cover device 10 according to the present embodiment has a configuration that when a force larger than the urging force of the cover-urging mechanism is exerted on the engagement protruding portion 83 by pushing in the tonneau cover 15 toward the winding direction B from the state where the engagement protruding portion 83 of the hook 80 is engaged with the locking portion 5 to hold the tonneau cover 15 at the pulled-out position (see FIG. 12A), the hook 80 swings, and while the slider 60 is pushed in toward the direction away from the sidewall 1 by the conversion mechanism (the shaft portions 84 and 85 and the groove portions 68 and 70 in the present embodiment), the engagement protruding portion 83 retracts into the case 30 to thereby release the engagement with the locking portion 5 (see FIGS. 12B and 12C). When the tonneau cover 15 is pushed in toward the winding direction B, the tonneau cover 15 itself may be pushed in, or the fixing device 20 fixed to the tonneau cover 15 may be pushed, and either will do.

The tonneau cover device 10 according to the present embodiment has the following configuration in order to maintain the state where the engagement protruding portion 83 of the hook 80 is engaged with the locking portion 5 as shown in FIGS. 11A and 12A.

Figure 13:
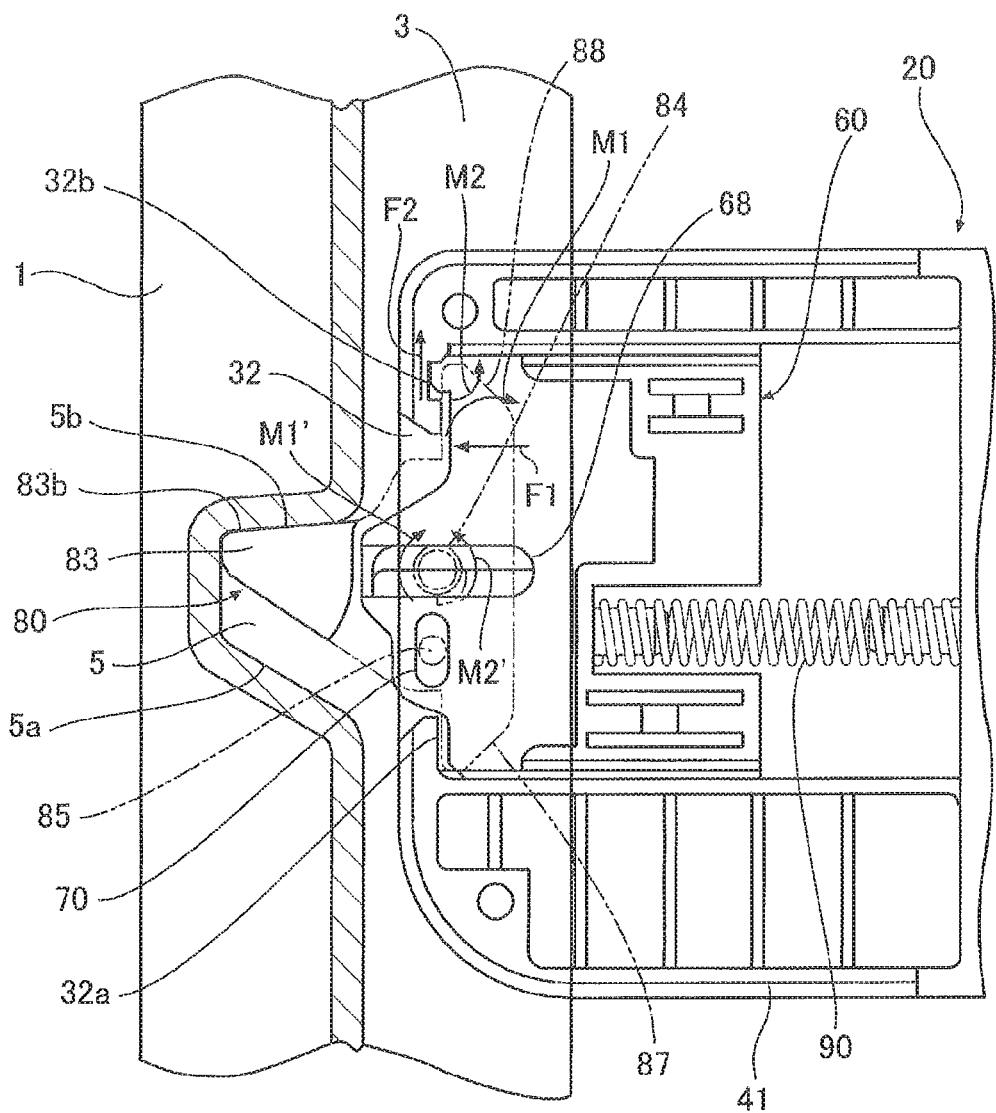
FIG. 13 is an explanatory view for illustrating the configuration in order that the hook is held in the state of being engaged with the locking portion.

To be specific, the tonneau cover device 10 according to the present embodiment has a configuration that in a case where the hook 80 includes the second supporting portion 88 that abuts on the winding-side edge portion 32*b* of the opening 32 of the case 30, and the winding-side edge portion 32*b* functions as a supporting point of the swinging movement of the hook 80 as in the present embodiment, M1>M2 is established, in case of M1 representing rotational moment produced when the hook 80 swings with an urging force F1 by the spring 90 while having the winding-side edge portion 32*b* as a supporting point of the swinging movement of the hook 80, while M2 representing rotational moment produced when the hook 80 swings with an urging force F2 by the cover-urging mechanism (not illustrated) while having the winding-side edge portion 32*b* as a supporting point of the swinging movement of the hook 80 as shown in FIG. 13.

With this configuration, the engagement protruding portion 83 of the hook 80 is brought into surface contact with the second inner surface 5*b* of the locking portion 5 (see FIG. 13), or the engagement protruding portion 83 erects to the second inner surface 5*b* to catch thereon, whereby the engaged state between the engagement protruding portion 83 of the hook 80 and the locking portion 5 is maintained (when M1<M2 is established, the engagement protruding portion 83 of the hook 80 swings in a direction of disengaging from the second inner surface 5*b* of the locking portion 5).

The tonneau cover device 10 according to the present embodiment has a configuration that in a case where the hook 80 includes no second supporting portion 88, M1'>M2' is established, under a condition such that M1' represents rotational moment produced when the hook 80 swings with an urging force F1 by the spring 90 while having the first shaft portion 84 as a supporting point of the swinging movement of the hook 80, and M2' represents rotational moment produced when the hook 80 swings with an urging force F2 by the cover-urging mechanism (not illustrated) while having the first shaft portion 84 as a supporting point of the swinging movement of the hook 80 as shown in FIG. 13.

As shown in FIGS. 12A to 12C, the tonneau cover device 10 according to the present embodiment has a configuration as follows. It is assumed that a sliding amount of the slider 60 in the direction away from the sidewall 1 when the tonneau cover 15 is pushed in toward the winding direction B from the state where the engagement protruding portion 83 is engaged with the locking portion 5 to hold the tonneau cover 15 at the pulled-out position, and the engagement protruding portion 83 is pressed toward the pull-out direction A of the tonneau cover 15 to cause the hook 80 to swing (see FIGS. 12B and 12C) to thereby release the engagement with the locking portion 5 is a first sliding amount. Further, it is assumed that a sliding amount of the slider 60 in the direction away from the sidewall 1, as shown in FIGS. 11A to 11C, when the tonneau cover 15 is pulled out toward the pull-out direction A from the state where the engagement protruding portion 83 is engaged with the locking portion 5 to hold the tonneau cover 15 at the pulled-out position, and the engagement protruding portion 83 is pressed toward the winding direction B of the tonneau cover 15 to cause the hook 80 to swing (see FIGS. 11B and 11C) to thereby release the engagement with the locking portion 5 is a second sliding amount. In the configuration, the first sliding amount is larger than the second sliding amount.

While the shaft portions are provided on the hook side and the groove portions are provided on the slider sides as the conversion mechanism in the present embodiment, shaft portions may be provided on the slider side and the groove portions may be provided to the hook side as the conversion mechanism. The conversion mechanism need not include shaft portions and groove portions as long as it is capable of converting the swinging movement of a hook into a sliding movement of a slider (e.g., a rack-and-pinion structure).

While two shaft portions are provided to the hook in the present embodiment, one shaft portion may be provided thereto. While the first supporting portion and the second supporting portion are provided to the hook in the present embodiment, no supporting portion may be provided thereto. Even in this case, the engagement protruding portion of the hook is pressed by the inner surface of the locking portion and the inner surface of the guide portion provided to the sidewall accompanied by pull-out and push-in movement of the tonneau cover, so that the hook can be swung, and the slider can be slid accompanied thereby.

Next, the operation and advantageous effect of the tonneau cover device 10 having the above-described configuration will be described.

To be specific, when the cargo chamber of the vehicle needs to be covered, the tonneau cover 15 is to be pulled out from the winding device (not illustrated) against the urging force of the cover-urging mechanism (not illustrated) while the fixing devices 20 are slid and guided by the guide portions 3 of the sidewalls 1. At this time, the engagement protruding portions 83 of the hooks 80 are pressed by the guide portions 3 of the sidewalls 1, whereby the sliders 60 are pushed in toward the direction away from the sidewalls 1 against the urging force of the spring 90. Then, when the tonneau cover 15 is stopped being pulled out at position where the engagement protruding portions 83 of the hooks 80 are matched to given locking portions 5, the sliders 60 are urged by the springs 90 while the second shaft portions 85 are pressed by the second groove portions 70 to push the hooks 80, and the engagement protruding portions 83 protrude from the openings 32 of the cases 30, whereby the second outer surfaces 83*b* of the engagement protruding portions 83 are engaged with the second inner surfaces 5*b* of the locking portions 5. Thus, the pulled-out position of the tonneau cover 15 is held to allow the tonneau cover 15 to cover the cargo chamber of the vehicle (see FIGS. 2, 11A, and 12A).

During the pull-out operation of the tonneau cover 15 described above, the first outer surfaces 83*a* or the distal ends of the engagement protruding portions 83 are pressed by the first inner surfaces 5a of the locking portions 5 or the inner surfaces of the guide portions 3 of the sidewalls 1, and the hooks 80 swing in the arrow E directions while the first supporting portions 87 swing with the pull-out-side edge portions 32a of the openings 32 as supporting points of the swinging movement. Then, the first shaft portions 84 slide inside the first groove portions 68 in the directions opposite to the protruding directions of the sliders 60 while the second shaft portions 85 slide inside to press the second groove portions 70 with drawing the swinging trajectories S on the outer sides of the first shaft portions 84, and the sliders 60 are pushed in toward the directions away from the sidewalls 1 against the urging forces of the springs 90. As a result, the engagement protruding portions 83 disengage from the locking portions 5 to release the engagement with the locking portions 5, as shown in FIGS. 11B and 11C.

The tonneau cover 15 is pushed in toward the winding direction B in order to wind the tonneau cover 15. Then, the second outer surfaces 83b or the distal ends of the engagement protruding portions 83 are pressed by the second inner surfaces 5b of the locking portions 5 or the inner surfaces of the guide portions 3 of the sidewalls 1, and the hooks 80 swing in the arrow F directions while the second supporting portions 88 swing with the winding-side edge portions 32b of the openings 32 as supporting points of the swinging movement. Then, the first shaft portions 84 slide inside the first groove portions 68 in the protruding directions of the sliders 60 while the second shaft portions 85 slide inside to press the second groove portions 70 with drawing the swinging trajectories S on the outer sides of the first shaft portions 84, and the sliders 60 are pushed in toward the directions away from the sidewalls 1 against the urging forces of the springs 90. As a result, the engagement protruding portions 83 disengage from the locking portions 5 to release the engagement with the locking portions 5, as shown in FIGS. 12B and 12C. Then, the tonneau cover 15 is wound by the winding device (not illustrated) with the urging force by the cover-urging means (not illustrated).

As described above, in the tonneau cover device 10 according to the present embodiment, when a force larger than the urging force of the cover-urging mechanism is exerted on the engagement protruding portions 83 when the tonneau cover 15 is pushed in toward the winding direction B, and the engagement protruding portions 83 of the hooks 80 are pressed by the inner surfaces of the locking portions 5 or the inner surfaces of the guide portions 3 of the sidewalls 1, the hooks 80 swing, and while the sliders 60 are pushed in toward the directions away from the sidewalls 1 by the conversion mechanism including the plural shaft portions 84 and 85 and the groove portions 68 and 70, the engagement protruding portions 83 retract into the cases 30 to thereby release the engagement with the locking portions 5 (see FIGS. 12B and 12C). Thus, the tonneau cover device 10 according to the present embodiment is capable of easily winding the tonneau cover 15 with simple operation of only pushing in the tonneau cover 15 toward the winding direction B, whereby winding workability of the tonneau cover 15 can be improved. Even when a user has a baggage with his/her hand, pushing in the tonneau cover 15 toward the winding direction B with his/her arm or elbow allows the tonneau cover 15 to be wound. When a user reaches out his/her hand from the rear seat to wind the tonneau cover 15, the tonneau cover 15 can be wound relatively easily.

The tonneau cover device 10 according to the present embodiment has the configuration as described above. It is assumed that the sliding amounts of the sliders 60 in the directions away from the sidewalls 1 when the tonneau cover 15 is pushed in toward the winding direction B from the state where the pulled-out position of the tonneau cover 15 is held to release the engaged engagement protruding portions 83 and locking portions 5 (see FIGS. 12A to 12C) are the first sliding amounts. Further, it is assumed that the sliding amounts of the sliders 60 in the directions away from the sidewalls 1 when the tonneau cover 15 is pulled out toward the pull-out direction A from the state where the pulled-out position of the tonneau cover 15 is held to release the engaged engagement protruding portions 83 and locking portions 5 (see FIGS. 11A to 11C) are the second sliding amounts. The first sliding amounts are larger than the second sliding amounts. Thus, in a state where the engagement protruding portions 83 are engaged with given locking portions 5 among the plural locking portions 5 on the sidewalls 1 to hold the tonneau cover 15 at the pulled-out position, a load imposed on the tonneau cover 15 at the time of being pulled out again can be decreased while a load imposed on the tonneau cover 15 at the time of being wound can be increased. Thus, the tonneau cover 15 can be easily pulled out, and can be securely maintained in the pull-out state.

The tonneau cover device 10 according to the present embodiment includes the conversion mechanism configured to convert the swinging movement of the hooks 80 into the sliding movement of the sliders 60 can have a relatively simple structure including the shaft portions of the first shaft portions 84 and the second shaft portions 85 and the groove portions of the first groove portions 68 and the second groove portions 70. When the hooks 80 swing, the first shaft portions 84 slide inside the first groove portions 68 while the second shaft portions 85 slide inside the second groove portions 70 to press the sliders 60 with drawing the swinging trajectories S on the outer sides of the first shaft portions 84, and the sliders 60 are pushed in toward the directions away from the sidewalls 1 (see FIGS. 11B and 11C and FIGS. 12B and 12C). As a result, the swinging movement of the hooks 80 can be reliably converted into the sliding movement of the sliders 60 with a high efficiency.

The tonneau cover device 10 according to the present embodiment has the configuration that the second shaft portions 85 provided to the hooks 80 are disposed closer to the pull-out direction A of the tonneau cover 15 than the first shaft portions 84 as shown in FIGS. 8A and 8B, so that when the tonneau cover 15 is pushed in toward the winding direction B, the sliders 60 can be largely slid toward the directions away from the sidewalls 1 as shown in FIG. 12C (can be largely slid compared with the sliding amount at the time of pulling out the tonneau cover 15 shown in FIG. 11C). As a result, the urging force of the springs 90 can be increased to improve the engagement force of the engagement protruding portions 83 with the locking portions 5.

The tonneau cover device 10 according to the present embodiment has the configuration that the hooks 80 include the first supporting portions 87 and the second supporting portions 88 that are capable of abutting on the edge portions on both sides of the openings 32 of the cases 30, and the first supporting portions 87 abut on the pull-out-side edge portions 32a of the openings 32 with the pull-out-side edge portions 32a as supporting points of the swinging movement of the hooks 80 when pulling out the tonneau cover 15 while the second supporting portions 88 abut on the winding-side edge portions 32b of the openings 32 with the winding-side edge portions 32b as supporting points of the swinging movement of the hooks 80 when winding the tonneau cover 15. Thus, when the tonneau cover 15 is pulled out or pushed in a state where the engagement protruding portions 83 of the hooks 80 are engaged with the given locking portions 5, the hooks 80 swing via the first supporting portions 87 and the second supporting portions 88 to push the sliders 60 in, whereby the engaged engagement protruding portions 83 and locking portions 5 can be released. At this time, the distance L2 between the second supporting portion 88 and the second shaft portion 85 is formed longer than the distance L1 between the first supporting portion 87 and the second shaft portion 85 as shown in FIGS. 8A and 8B. Thus, the radius of the swinging movement of the second shaft portions 85 decreases when the first supporting portions 87 abut on the pull-out-side edge portions 32a of the openings 32 to cause the hooks 80 to swing when the tonneau cover 15 is pulled out in a state where the engagement protruding portions 83 of the hooks 80 are engaged with the given locking portions 5. The radius of the swinging movement of the second shaft portions 85 increases when the second supporting portions 88 abut on the winding-side edge portions 32b of the openings 32 to cause the hooks 80 to swing when the tonneau cover 15 is pushed in toward the winding direction. Thus, when pulling out the tonneau cover 15, the sliding amounts of the sliders 60 are decreased to lower the repelling forces of the springs 90, and thus the tonneau cover 15 can be pulled out with a small load. When pushing in the tonneau cover 15, the sliding amounts of the sliders 60 are increased to raise the repelling forces of the springs 90, so that the load imposed on the tonneau cover 15 can be increased, which can prevent the engagement of the tonneau cover 15 from unexpected disengagement due to vibration of the vehicle or the like.

In the present embodiment, the springs 90 are provided to press the positions of the sliders 60 that overlap the second groove portions 70 provided to the sliders 60 when the sliders 60 are seen in the sliding directions C as shown in FIG. 9. Thus, the pressure force by the second shaft portions 85 during the swinging movement of the hooks 80 and the urging force by the springs 90 act on to be opposed to each other, so that a biased load is not easily exerted on the sliders 60, whereby the sliders 60 can be slid smoothly.

The present invention is not limited to the embodiment described above, and that it is also possible to add a variety of modifications to the embodiment. Such embodiments will also fall within the scope of the present invention.

The invention claimed is:

1. A tonneau cover device including:
    a tonneau cover provided to cover a cargo chamber of a vehicle and configured to be pulled out from a wound state;
    a fixing device attached on both sides of the tonneau cover at one end thereof toward a pull-out direction; and
    a cover-urging mechanism configured to urge the tonneau cover in a winding direction that is opposite to the pull-out direction,
    wherein a locking portion is provided on a sidewall of the cargo chamber and configured to be engageable with the fixing device on the tonneau cover when the tonneau cover is pulled out against an urging force of the cover-urging mechanism to thereby hold the tonneau cover at a pulled-out position,
    wherein the fixing device includes:
        a case fixed to the tonneau cover, the case having an opening opposed to the sidewall;
        a slider mounted slidably on the case, the slider being slidable in a sliding direction intersecting the pull-out direction;
        a hook supported swingably on the slider, the hook having an engagement protruding portion configured to retractably protrude from the opening of the case in accordance with a swinging movement of the hook to be engageable with the locking portion;
        a spring provided to urge the slider against the sidewall; and
        a conversion mechanism configured to convert a sliding movement of the slider toward the sidewall into a swinging movement of the hook such that the engagement protruding portion protrudes from the opening of the case, and to convert a sliding movement of the slider to be away from the sidewall into a swinging movement of the hook such that the engagement protruding portion retracts into the case, and
    wherein, when a force is exerted on the engagement protruding portion as a result of pushing in the tonneau cover toward the winding direction from a pulled-out-and-held state where the engagement protruding portion is engaged with the locking portion and the tonneau cover is held at the pulled-out position, and the exerted force acting on the engagement protruding portion is larger than the urging force of the cover-urging mechanism acting on the engagement protruding portion, the hook swings such that the engagement protruding portion retracts into the case while causing the slider to be pushed in away from the sidewall through the conversion mechanism, thereby being disengaged from the locking portion.

2. The tonneau cover device of claim 1,
    wherein a sliding amount of the slider to be away from the sidewall when the engagement protruding portion is pressed toward the pull-out direction to cause the hook to swing as a result of pushing in the tonneau cover toward the winding direction from the pulled-out-and-held state to thereby be disengaged from the locking portion is a first sliding amount,
    wherein a sliding amount of the slider to be away from the sidewall when the engagement protruding portion is pressed toward the winding direction to cause the hook to swing as a result of pulling out the tonneau cover toward the pull-out direction from the pulled-out-and-held state to thereby be disengaged from the locking portion is a second sliding amount, and
    wherein the first sliding amount is larger than the second sliding amount.

3. The tonneau cover device of claim 1,
    wherein the conversion mechanism includes:
        a shaft portion provided to one of the slider and the hook; and
        a groove portion provided to the other of the slider and the hook, into which the shaft portion is slidably inserted,
    wherein the shaft portion includes:
        a first shaft portion; and
        a second shaft portion,
    wherein the groove portion includes:
        a first groove portion that is formed along the sliding direction, into which the first shaft portion is slidably inserted; and
        a second groove portion that is formed to intersect the first groove portion, into which the second shaft portion is slidably inserted, and
    wherein, when the hook swings, the first shaft portion slides inside the first groove portion while the second shaft portion slides inside the second groove portion to draw a swinging trajectory on an outer side of the first shaft portion, so that the slider is pressed to slide.

4. The tonneau cover device of claim 3,
wherein the second shaft portion is disposed further than the first shaft portion in the pull-out direction.

5. The tonneau cover device of claim 3,
wherein the hook includes a first supporting portion and a second supporting portion that are capable of abutting on edge portions on both sides of the opening of the case,
wherein, when the tonneau cover is pulled out, the first supporting portion abuts on one of the edge portions on the pull-out direction, and the one of the edge portions functions as a supporting point of the swinging movement of the hook,
wherein, when the tonneau cover is wound in the winding direction, the second supporting portion abuts on the other one of the edge portions on the winding direction, and the other one of the edge portions functions as a supporting point of the swinging movement of the hook, and
wherein a distance between the second supporting portion and the second shaft portion is longer than a distance between the first supporting portion and the second shaft portion.

6. The tonneau cover device of claim 3,
wherein the spring presses a position of the slider that overlaps the second groove portion when the slider is seen in the sliding direction.

* * * * *